(12) United States Patent
Word et al.

(10) Patent No.: US 11,514,513 B2
(45) Date of Patent: Nov. 29, 2022

(54) SYSTEMS AND METHODS FOR MANAGEMENT OF FINANCIAL TRANSACTIONS ASSOCIATED WITH A FUNDING AGREEMENT

(71) Applicant: JPMORGAN CHASE BANK, N.A., New York, NY (US)

(72) Inventors: Gary Word, New York, NY (US); Tracy L. Dangott, Chicago, IL (US); Jacob Mendel, New York, NY (US); Yoav Intrator, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 149 days.

(21) Appl. No.: 16/886,769

(22) Filed: May 28, 2020

(65) Prior Publication Data

US 2021/0374844 A1 Dec. 2, 2021

(51) Int. Cl.
| | |
|---|---|
| *G06Q 40/02* | (2012.01) |
| *G06Q 10/10* | (2012.01) |
| *G06Q 20/40* | (2012.01) |
| *G06Q 40/00* | (2012.01) |
| *G06N 20/00* | (2019.01) |
| *G06F 16/23* | (2019.01) |

(52) U.S. Cl.
CPC ......... *G06Q 40/02* (2013.01); *G06F 16/2315* (2019.01); *G06N 20/00* (2019.01); *G06Q 10/10* (2013.01); *G06Q 20/405* (2013.01); *G06Q 20/407* (2013.01); *G06Q 40/12* (2013.12)

(58) Field of Classification Search
CPC ........ G06Q 40/02; G06Q 40/12; G06Q 10/10; G06Q 20/405
See application file for complete search history.

(56) References Cited

U.S. PATENT DOCUMENTS

| | | | |
|---|---|---|---|
| 10,755,281 B1 * | 8/2020 | Yip .................... | G06Q 20/4016 |
| 2002/0059137 A1 * | 5/2002 | Freeman .............. | G06Q 40/025 |
| | | | 705/38 |
| 2005/0159213 A1 * | 7/2005 | Okada ................... | G06Q 20/04 |
| | | | 463/25 |

(Continued)

*Primary Examiner* — Florian M Zeender
*Assistant Examiner* — Christopher R Buchanan
(74) *Attorney, Agent, or Firm* — Greenberg Traurig LLP

(57) ABSTRACT

A method for management of financial transactions associated with a funding agreement may include: receiving, at the award information management system and from an awarding organization, details for a funding award comprising an identification of an award recipient, an award amount, and a condition on the use of the award; notifying an award drawdown management system of the award details; identifying a plurality of participating financial institutions to the award recipient; receiving a registration of an account at one of the financial institutions for receiving drawdown funds; communicating an amount of the payment to the fund reporting and analysis system; receiving transaction details from the financial institution having the award recipient's registered account; and providing reports of all transactions in the registered account and any and all optional card accounts with detailed analysis of part transaction, current balances and predictions of future drawdown requests.

14 Claims, 2 Drawing Sheets

(56) References Cited

U.S. PATENT DOCUMENTS

| | | | |
|---|---|---|---|
| 2011/0288967 A1* | 11/2011 | Selfridge | G06Q 40/12 |
| | | | 705/30 |
| 2014/0180926 A1* | 6/2014 | Rethorn | G06Q 20/381 |
| | | | 705/44 |
| 2015/0006393 A1* | 1/2015 | Allin | G06Q 20/14 |
| | | | 705/44 |
| 2015/0127527 A1* | 5/2015 | Eide | G06Q 20/227 |
| | | | 705/39 |
| 2016/0358417 A1* | 12/2016 | Sanford | G07F 17/3255 |
| 2017/0357956 A1* | 12/2017 | Borkar | G06Q 20/40145 |
| 2021/0027290 A1* | 1/2021 | Tiwan | G06Q 20/40145 |
| 2021/0051013 A1* | 2/2021 | Li | G06Q 50/182 |

* cited by examiner

SYSTEMS AND METHODS FOR MANAGEMENT OF FINANCIAL TRANSACTIONS ASSOCIATED WITH A FUNDING AGREEMENT

FIELD OF THE INVENTION

The present disclosure relates generally to systems and methods for management of financial transactions associated with a funding agreement.

DESCRIPTION OF THE RELATED ART

Organizations that provide funding to other organizations for specific purposes in accordance with a funding agreement often rely on the fund recipient providing evidence that the funds have been used in a manner consistent with the agreement. Audits of the fund recipient's organizations is costly, time consuming and confirms compliance with the agreement or misuse of funds on an extended timeline. Financial organizations that have details on how funds are spent do not currently have mechanisms in place for sharing bank data with a third party. Since funding recipients may each use a different financial organization, funding organizations that seek information from financial organizations will need information from multiple financial organizations. The information must be handled securely and be accessible only to authorized organizations.

SUMMARY OF THE INVENTION

Systems and methods for management of financial transactions associated with a funding agreement are disclosed. In one embodiment, in an award management system comprising an award information management system, an award drawdown system, and a fund reporting and analysis system, comprising at least one computer processor, a method for management of financial transactions associated with a funding agreement may include: (1) receiving, at the award information management system and from an awarding organization, details for a funding award comprising an identification of an award recipient, an award amount, and a condition on the use of the award; (2) notifying, by the award information management system, an award drawdown management system of the award details; (3) identifying, by the award information management system, a plurality of participating financial institutions to the award recipient; (4) receiving, at the award drawdown system and from the award recipient, a registration of an account at one of the participating financial institutions for receiving drawdown funds; (5) receiving, at the award drawdown system and from the award recipient, a payment request; (6) communicating, by the award information management system, the payment request to a financial institution associated with the awarding organization, wherein the financial institution associated with the awarding organization sends the funds to the account registered by the award recipient; (7) communicating, by the award drawdown management system, an amount of the payment to the fund reporting and analysis system; (8) receiving, at the fund reporting and analysis system, transaction details from the financial institution having the award recipient's registered account; (9) matching, by the fund reporting and analysis system, the payment to a transaction in the transaction information; and (10) providing reports and details on balances and transactions to the awarding organization.

In one embodiment, the financial institution having the registered account may provide transaction details periodically.

In one embodiment, the transactions reported may include the drawdowns that are payments into the registered account.

In one embodiment, the method may further include reversing, by the fund reporting and analysis system, the payment in response to the payment not meeting the condition on the use of the award. The condition may include a spending restriction or a spending requirement for the award, such as a requirement to spend each drawdown within a specified timeframe.

In one embodiment, the award information management system, the award drawdown system, and the fund reporting and analysis system are nodes in a distributed ledger network.

In one embodiment, a transaction in the transaction information may include an authorized expenditure.

In one embodiment, the transactions may be conducted with a credit account, and the method may further include predicting, using machine learning, a drawdown request to pay a balance on the credit account and known due dates or past payment dates.

According to another embodiment, a system for management of financial transactions associated with a funding agreement may include: an award information management system; an award drawdown management system; and a fund reporting and analysis system. The award information management system receives, from an awarding organization, details for a funding award comprising an identification of an award recipient, an award amount, and a condition on the use of the award, notifies the award drawdown management system of the award details, and identifies a plurality of participating financial institutions to the award recipient. The award drawdown system receives a registration of an account at one of the financial institutions for receiving drawdown funds from the award recipient and receives a payment request from the award recipient. The award drawdown system communicates the payment request to a payment processing service or to a financial institution associated with the awarding organization, wherein the financial institution associated with the awarding organization sends the funds to the account received by the award recipient. The drawdown management system communicates an amount of the payment to the fund reporting and analysis system. The fund reporting and analysis system receives transaction details from the financial institution having the award recipient's registered account, and matches the payment to a transaction in the transaction information.

In one embodiment, the financial institution having the registered account may provide transaction details periodically.

In one embodiment, the transaction details may include one or more drawdowns.

In one embodiment, the fund reporting and analysis system may reverse the payment in response to the payment not meeting one of the conditions on the use of the award. The condition may include a spending restriction or a spending requirement for the award, such as a requirement to spend each drawdown within a specified timeframe.

In one embodiment, the system may further include a distributed ledger network, and the award information management system, the award drawdown system, and the fund reporting and analysis system participate in the distributed ledger network as nodes.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
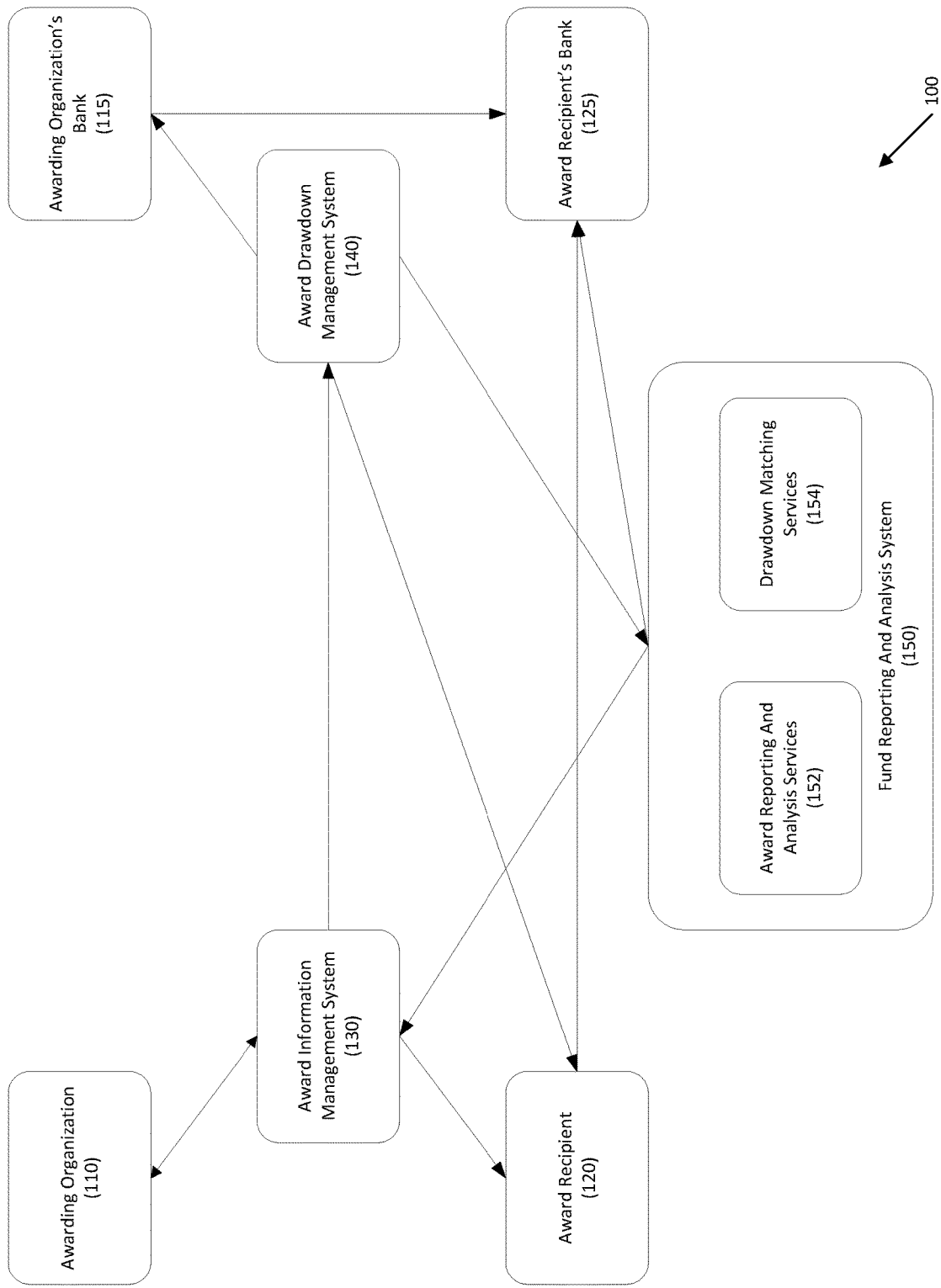
FIG. 1 depicts a system for management of financial transactions associated with a funding agreement according to one embodiment.

Systems and methods for management of financial transactions associated with a funding agreement are disclosed. According to one embodiment, financial organizations can provide details on financial transactions associated with a funding account—an account that is in receipt of the original funds. The account may be a primary account, a sub-account, a virtual account, etc. The funding organization can include requirements for or incentives to funding applicants and include such as part of the funding application process for a funding agreement.

An example of such funding is a grant provided by a grantor (i.e., a funding organization) to a grantee (i.e., a fund recipient).

In embodiments, fund recipients will need to satisfy the financial organizations requirements for sharing information, such as providing authorization to the financial organization to release details associated with the Funded Account to the funding organization.

In embodiment, the funded account is expected to be used by the funding recipient exclusively for a specific funding arrangement. A funding agreement may include the ability for the primary funding recipient to subsequently reach other funding agreements with other funding recipients, using the original funding organizations funds as the source of funds for these so-called sub-awards.

Embodiments may track the sub-awards and may provide information to the sub-award organization on the financial transactions associated with the sub-award as well as an aggregated view of all such sub-awards to the primary funding organization.

In embodiments, a funding agreement permits the use of credit card or other commercial card accounts, with the drawn down funds being used to pay the card account when due. In such cases, card transaction details may be included as part of the financial transaction information flow and may optionally reconcile the debits on the funded account that are used to pay the card account with the credits on the card account of such payment.

In embodiments, information on the funding transactions, sometimes referred to as "drawdown" transactions, may be provided by the funding organization or its delegated award drawdown management system to the financial organization for reconcilement with the credits to the Funded Account. This is useful for cases where the fund recipient may receive other funds credited to the funded account that are consistent with the intent of the funding arrangement which by way of example may be refunds or revenue from operations.

In embodiments, the funding recipient may supplement information associated with the financial transactions, such as from a general ledger system that could be reconciled with the financial transactions associated with the funded account or manually entered for each transaction, that can provide one or more tags or other details for the transactions on the financial account that may be used to categorize and provide an aggregated summery report of the transactions.

In embodiments, distributed ledger technology, such as blockchain technology, may be used to create a network that can secure information, provide secure channels of communication between parties and permit multiple financial organizations as well as multiple funding organizations to all use a common distributed ledger with public and private data stores for many funding arrangements across multiple industries and for multiple purposes.

Using a distributed ledger's ability to execute code, "Smart Contracts," or "Distributed Apps (DApps)," or both, may be deployed to securely view some or all of the information accessible to the distributed ledger participant and create enrichment and analysis of the information, which may have been provided by multiple financial organizations.

Code that executes some of the terms of the funding agreement which, if included in the funding agreement and if permitted by the financial organization, may involve the initiation of financial transactions may be provided. For example, if a funding agreement includes what are sometimes called a "just-in-time funding" clause for drawdowns, meaning the funds from a drawdown must be used within a specific period and not held in the Funded Account beyond that period of time, then a Smart Contract may be used to monitor drawdowns and ensure that either the funds are utilized or returned, with a failure to use or return the funds triggering a financial transaction to debit the unused funds and return them to the funding organization's account.

Referring to FIG. 1, a system for management of financial transactions associated with a funding agreement is disclosed according to one embodiment. System 100 may include awarding or funding organization 110, which may grant an award to award recipient 120. Awarding organization may be associated with awarding organization's bank, which may be any suitable financial institution.

Awarding organization 110 may interface with award information management system 130, which may also interface with award recipient 120 to manage the award, and the recipient's use of the award. Award information management system 130 may interface with award drawdown management system, which may manage the award recipient's drawdowns on the award.

Awarding organization 110 may be any suitable entity that issues funding or an award to award recipient 120. For example, awarding organization 110 may be a private organization, government organization or agency, an individual, etc.

Award recipient 120 may be any suitable recipient of funding, including individuals, organizations, etc. Award recipient 120 may have an account with award recipient's bank 125. Award recipient's bank 125 may receive funding from awarding organization's bank 115.

Award recipient's bank 125 may provide limited bank data, such as data limited to the specific awarding organization 110 or award recipient 120. For example, limited grant data may include bank and account numbers, daily balances, and transactions with varying amounts of details as authorized by the award recipient that is the account owner.

Fund reporting and analysis system 150 may provide reporting, matching, and analytics. Fund reporting and analysis system 150 may receive information from award drawdown management system 140, and may provide reporting to award information management system 130.

Fund reporting and analysis system 150 may include award reporting and analysis services 152, which may provide analysis of the use of the award, and drawdown matching service 154, which may match drawdowns by the award recipient with authorized expenditures.

Drawdown matching service 154 may provide drawdown matching (e.g., tagging of account credits that match a drawdown) and drawdown reporting (e.g., drawdown dates and amounts). In one embodiment, drawdown source data may be sourced from award drawdown management system 140.

In one embodiment, fund reporting and analysis system 150 may support multiple banks, multiple award drawdown management systems, multiple award information management systems. Award information management system 130 may also support multiple awarding organizations 110.

Although award information and management system 130, award drawdown management system 140, and funds analysis and reporting system 150 are three separate systems, these systems may be provided as one unified system, or any two of the systems may be combined into a single system.

In one embodiment, some or all of the entities in FIG. 1 may participate as nodes in a distributed ledger. In one embodiment, the distributed ledger may be a permissioned, private distributed ledger.

In one embodiment, the award recipient may designate additional accounts associated with the award, such as corporate card accounts. Card account information may be sourced directly from the issuing bank or from the card network, both with the permission of the account owner. In cases where one or more card accounts are linked to the award recipient and an award, the balances and transaction details for the card accounts are included in the report.

Analysis of the original funding account and the other accounts may be further performed to match payments made to the card accounts from the original funding account. The addition of the card transactions to the report provides the awarding organization with card transactions that have additional details on the merchant associated with each card transaction, including merchant name, merchant category code and many other details not available in a payment transaction from a checking account. For card accounts that are extending credit, the card transactions provide an ability to perform an analysis on likely future drawdown requests to pay the monthly card account bill. For example, machine learning may be used for this task.

Figure 2:
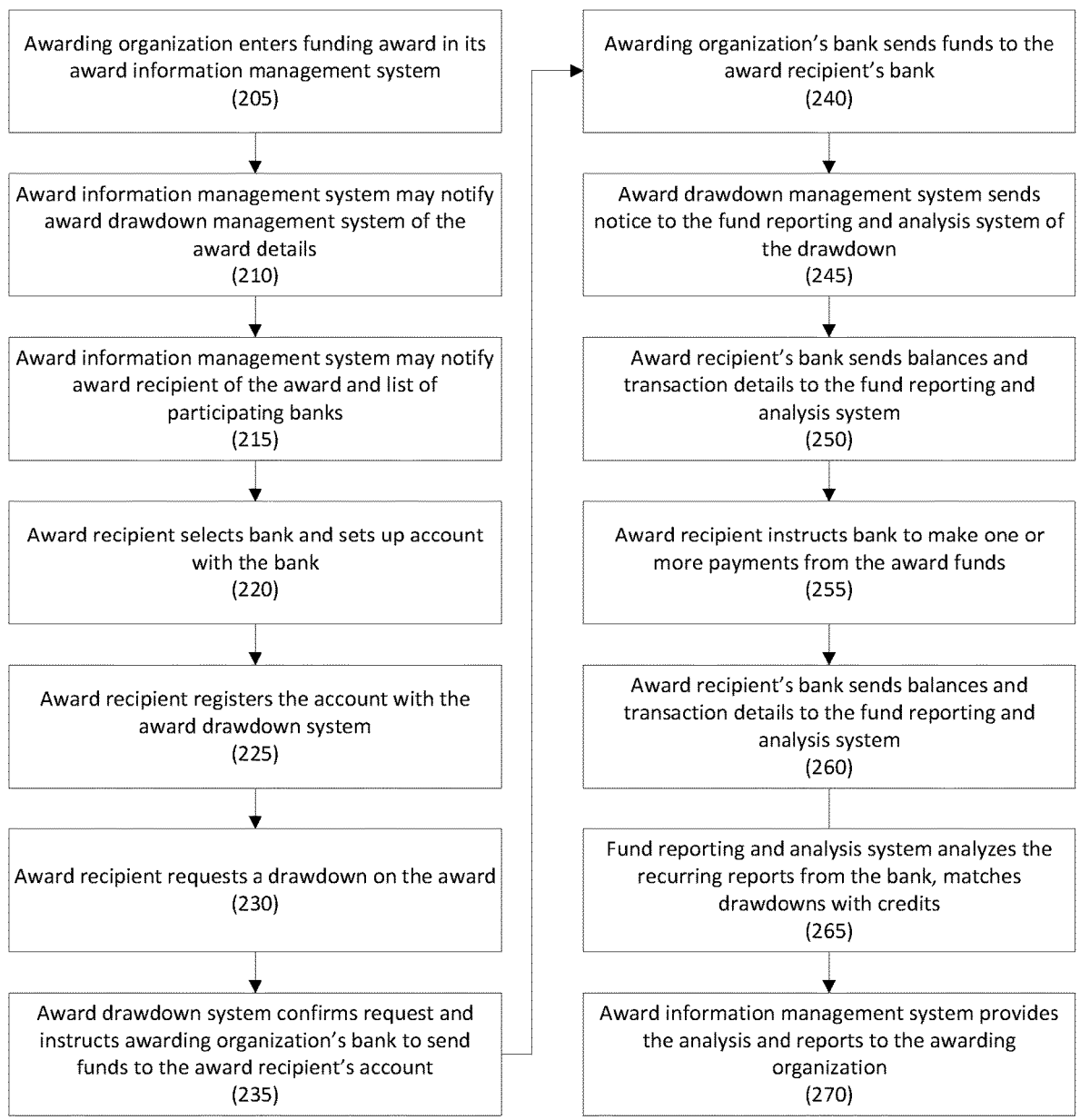
FIG. 2 depicts a method for management of financial transactions associated with a funding agreement according to one embodiment.

Referring to FIG. 2, a method for management of financial transactions associated with a funding agreement is disclosed according to one embodiment In step 205, the awarding organization may enter details for a funding award in, for example, an award information management system. For example, the funding organization may identify the award recipient, the amount of the award, and any spending restrictions, spending requirements or other conditions on the use of the award.

In one embodiment, the awarding organization may create the entry in an award database in an award information management system.

In step 210, the award information management system may notify an award drawdown management system of the award details.

In step 215, the award information management system may notify the award recipient of the award. The notification may identify one or more banks or financial technology providers (FinTechs) that participate with the award information management system and can report award spend.

In step 220, the award recipient may identify one of the banks and may set up an account with the bank. The award recipient must authorize the reporting of bank account details to the awarding organization and the award information management system.

In step 225, the award recipient may register the account with the award drawdown system as the account where drawn down funds should be credited.

In step 230, the award recipient requests a drawdown on the award. the request may be made to the award drawdown management system.

In step 235 the award drawdown management system may confirm the request and may instruct the awarding organization's bank to send funds to the account at the award recipient's bank.

In step 240, the awarding organization's bank may send the requested funds to the award recipient's bank.

In step 245, the award drawdown management system may send a notice to a fund reporting and analysis system of the drawdown. The notice may include the date and amount of the drawdown.

In one embodiment, if the drawdowns are reported, they may be matched to the credits in the award bank account.

In step 250, the award recipient's bank may send balances and transaction details on a recurring basis, on demand, or as otherwise necessary and/or desired to the fund reporting and analysis system. This may include the funds that were sent to the fund recipient's bank in step 240.

In step 255, the award recipient may instruct the award organization's bank to make one or more payments from the award funds.

In step 260, the award recipient's bank may send balances and transaction details on a recurring basis, on demand, or as otherwise necessary and/or desired to the fund reporting and analysis system, including the debits in step 255.

In step 265, the fund reporting and analysis system may analyze the reports from the bank, may match drawdowns with credits, and may provide other analytical services. The fund reporting and analysis system may provide or otherwise make available the reports to the award information management system.

In one embodiment, the fund reporting and analysis system may take action(s) based on a set of rules and the collective award and drawdown data and award analysis. For example, a rule may require a drawdown to be reversed if funds are not spent within an allotted number of business days.

In step 270, the award information management system may provide or otherwise make available the analysis and reports to the awarding organization.

In one embodiment, steps 255-270 may be repeated until the award funds are exhausted or until the account is closed.

In one embodiment more than one account may be associated with a single award. The analysis and reporting may match the transactions between such accounts.

Although multiple embodiments have been disclosed, it should be recognized that these embodiments are not exclusive and features from one may be used with others.

Hereinafter, general aspects of implementation of the systems and methods of the embodiments will be described.

The system of the embodiments or portions of the system of the embodiments may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, Python, REXX, Visual Basic, and/or JavaScript, for example. Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A method for management of financial transactions associated with a funding agreement, comprising:

in an award management system comprising a distributed ledger network, an award information management system that is configured as a first node in the distributed ledger network, an award drawdown system that is configured as a second node in the distributed ledger network, and a fund reporting and analysis system that is configured as a third node in the distributed ledger network, and comprising at least one computer processor:

defining, on the distributed ledger network, a smart contract, wherein the smart contract is configured to initiate fund transactions based on terms of the funding agreement;

receiving, at the award information management system and from an awarding organization, details for a funding award comprising an identification of an award recipient, an award amount, and a condition on the use of the award;

notifying, by the award information management system, the award drawdown management system of the award details;

identifying, by the award information management system, a plurality of participating financial institutions to the award recipient;

receiving, at the award drawdown system and from the award recipient, a registration of an account at one of the participating financial institutions for receiving drawdown funds;

receiving, at the award drawdown system and from the award recipient, a payment request;

communicating, by the award information management system, the payment request to a financial institution associated with the awarding organization, wherein the smart contract initiates a fund transaction from the financial institution associated with the awarding organization and the fund transaction instructs the financial institution associated with the awarding organization to send the funds to the account registered by the award recipient;

communicating, by the award drawdown management system, an amount of the payment to the fund reporting and analysis system;

receiving, at the fund reporting and analysis system, transaction details from the financial institution having the award recipient's registered account;

matching, by the fund reporting and analysis system, the payment to a transaction in the transaction information; and providing reports and details on balances and transactions to the awarding organization.

2. The method of claim 1, wherein the financial institution having the registered account provides transaction details periodically.

3. The method of claim 1, wherein the transactions reported comprise drawdowns that are payments into the registered account.

4. The method of claim 1, further comprising:
reversing, by the fund reporting and analysis system, the payment in response to the payment not meeting the condition on the use of the award.

5. The method of claim 4, wherein the condition comprises a spending restriction or a spending requirement for the award.

6. The method of claim 5, wherein the spending requirement is to spend each drawdown within a specified timeframe.

7. The method of claim 1, wherein a transaction in the transaction information comprises an authorized expenditure.

8. The method of claim 1, wherein the transactions are conducted with a credit account, and further comprising:
predicting, using machine learning, a drawdown request to pay a balance on the credit account and known due dates or past payment dates.

9. A system for management of financial transactions associated with a funding agreement, comprising:
an award information management system that is configured as a first node of a distributed ledger network;
an award drawdown management system that is configured as a second node in the distributed ledger network;
a fund reporting and analysis system that is configured as a third node in the distributed ledger network; and
a smart contract that executes on the distributed ledger network wherein the smart contract is configured to initiate fund transactions based on terms of the funding agreement;
wherein:
the award information management system receives, from an awarding organization, details for a funding award comprising an identification of an award recipient, an award amount, and a condition on the use of the award;
the award information management system notifies the award drawdown management system of the award details;
the award information management system identifies a plurality of participating financial institutions to the award recipient;
the award drawdown management system receives a registration of an account at one of the financial institutions for receiving drawdown funds from the award recipient;
the award drawdown management system receives a payment request from the award recipient;
the award drawdown management system communicates the payment request to a payment service or to a financial institution associated with the awarding organization, wherein the smart contract initiates a fund transaction from the financial institution associated with the awarding organization and the fund transaction instructs the financial institution associated with the awarding organization to send the funds to the account received by the award recipient;
the award drawdown management system communicates an amount of the payment to the fund reporting and analysis system;
the fund reporting and analysis system receives transaction details from the financial institution having the award recipient's registered account; and
the fund reporting and analysis system matches the payment to a transaction in the transaction information.

10. The system of claim 9, wherein the financial institution having the registered account provides transaction details periodically.

11. The system of claim 9, wherein transaction details may include at least one drawdown.

12. The system of claim 9, wherein the fund reporting and analysis system reverses the payment in response to the payment not meeting the condition on the use of the award.

13. The system of claim 12, wherein the condition comprises a spending restriction or a spending requirement for the award.

14. The system of claim 13, wherein the spending requirement comprises a requirement to spend each drawdown within a specified timeframe.

\* \* \* \* \*